United States Patent
Tabayashi et al.

(10) Patent No.: US 7,365,642 B2
(45) Date of Patent: Apr. 29, 2008

(54) SEMICONDUCTOR INTEGRATED CIRCUIT, MOBILE MODULE, AND MESSAGE COMMUNICATION METHOD

(75) Inventors: Yo Tabayashi, Tokyo (JP); Atsushi Funakiri, Kanagawa (JP); Kanahiro Shirota, Kanagawa (JP); Atsuo Kurokawa, Kanagawa (JP)

(73) Assignee: Sony Corporation (JP)

( * ) Notice: Subject to any disclaimer, the term of this patent is extended or adjusted under 35 U.S.C. 154(b) by 315 days.

(21) Appl. No.: 11/052,075

(22) Filed: Feb. 8, 2005

(65) Prior Publication Data

US 2005/0191968 A1 Sep. 1, 2005

(30) Foreign Application Priority Data

Feb. 24, 2004 (JP) ............................. P2004-047918

(51) Int. Cl.
G08B 23/00 (2006.01)
G08B 13/14 (2006.01)
G08B 1/08 (2006.01)
H04B 5/00 (2006.01)
H04B 7/00 (2006.01)

(52) U.S. Cl. ................ 340/505; 340/539.1; 340/572.1; 340/825.69; 340/825.72; 455/41.1; 455/41.2

(58) Field of Classification Search ...................... None
See application file for complete search history.

(56) References Cited

U.S. PATENT DOCUMENTS 5,929,414 A 7/1999 Saitoh 6,045,043 A 4/2000 Bashan et al.
6,161,762 A 12/2000 Bashan et al.
2002/0177407 A1 * 11/2002 Mitsumoto ................... 455/41

FOREIGN PATENT DOCUMENTS

| EP | 0 945 828 A2 | 9/1999 |
|----|--------------|--------|
| EP | 1 258 831 A2 | 11/2002 |
| EP | 1 313 063 A2 | 5/2003 |
| JP | 2003-168092 | 6/2003 |
| JP | 2003-256751 | 9/2003 |
| JP | 02003256751 A * | 9/2003 |
| WO | WO 99/21119 | 4/1999 |
| WO | WO 00/14672 | 3/2000 |

OTHER PUBLICATIONS

SG Patent Application Written Opinion and Search Report, Dated Jan. 20, 2006.

* cited by examiner

*Primary Examiner*—Julie Lieu
(74) *Attorney, Agent, or Firm*—Rader Fishman & Grauer PLLC; Ronald P. Kananen

(57) ABSTRACT

A semiconductor integrated circuit including a contact-type communication unit for acquiring a contact-type message in a contact communication from an external apparatus, a contactless-type communication unit for acquiring a contactless-type message in a contactless communication, a contact-type message processor for processing the contact-type message, a contactless-type message processor for processing the contactless-type message, and a message relay unit for acquiring the contact-type message from the contact-type communication unit to supply the contact-type message to the contact-type message processor and acquiring the contactless-type message from the contactless-type communication unit to supply the contactless-type message to the contactless-type message processor.

28 Claims, 13 Drawing Sheets

| CLA | INS | COMMAND |
|-----|-----|---------|
| 0X | A4 | FILE SELECTION |
| 0X | 20 | VERIFY |
| 0X | CA | DATA ACQUISITION |
| 0X | DC | DATA UPDATING |
| ⋮ | ⋮ | ⋮ |
| XX | FF | CONTAINING CONTACTLESS-TYPE COMMAND |
| XX | A4 | CONTAINING FILE SELECTION + CONTACTLESS-TYPE COMMAND |
| ⋮ | ⋮ | ⋮ |

306 / 406 / 408 / 410 / 402

| CD | COMMAND |
|----|---------|
| 01 | AUTHENTICATION |
| 02 | FILE UPDATING |
| 03 | DATA WRITING |
| ⋮ | ⋮ |
| F0 | CONTAINING CONTACT-TYPE COMMAND |
| F1 | CONTAINING AUTHENTICATION + CONTACT-TYPE COMMAND |
| ⋮ | ⋮ |

| CLA | INS | COMMAND | 402 |
|-----|-----|---------|-----|
| 0X | A4 | FILE SELECTION | |
| 0X | 20 | VERIFY | |
| 0X | CA | DATA ACQUISITION | |
| 0X | DC | DATA UPDATING | |
| ⋮ | ⋮ | ⋮ | |
| XX | FF | CONTAINING CONTACTLESS-TYPE COMMAND | |
| XX | A4 | CONTAINING FILE SELECTION + CONTACTLESS-TYPE COMMAND | |
| ⋮ | ⋮ | ⋮ | |

(columns 406, 408, 410)

FIG. 4B

| CD | COMMAND | 412 |
|----|---------|-----|
| 01 | AUTHENTICATION | |
| 02 | FILE UPDATING | |
| 03 | DATA WRITING | |
| ⋮ | ⋮ | |
| F0 | CONTAINING CONTACT-TYPE COMMAND | |
| F1 | CONTAINING AUTHENTICATION + CONTACT-TYPE COMMAND | |
| ⋮ | ⋮ | |

(columns 414, 416)

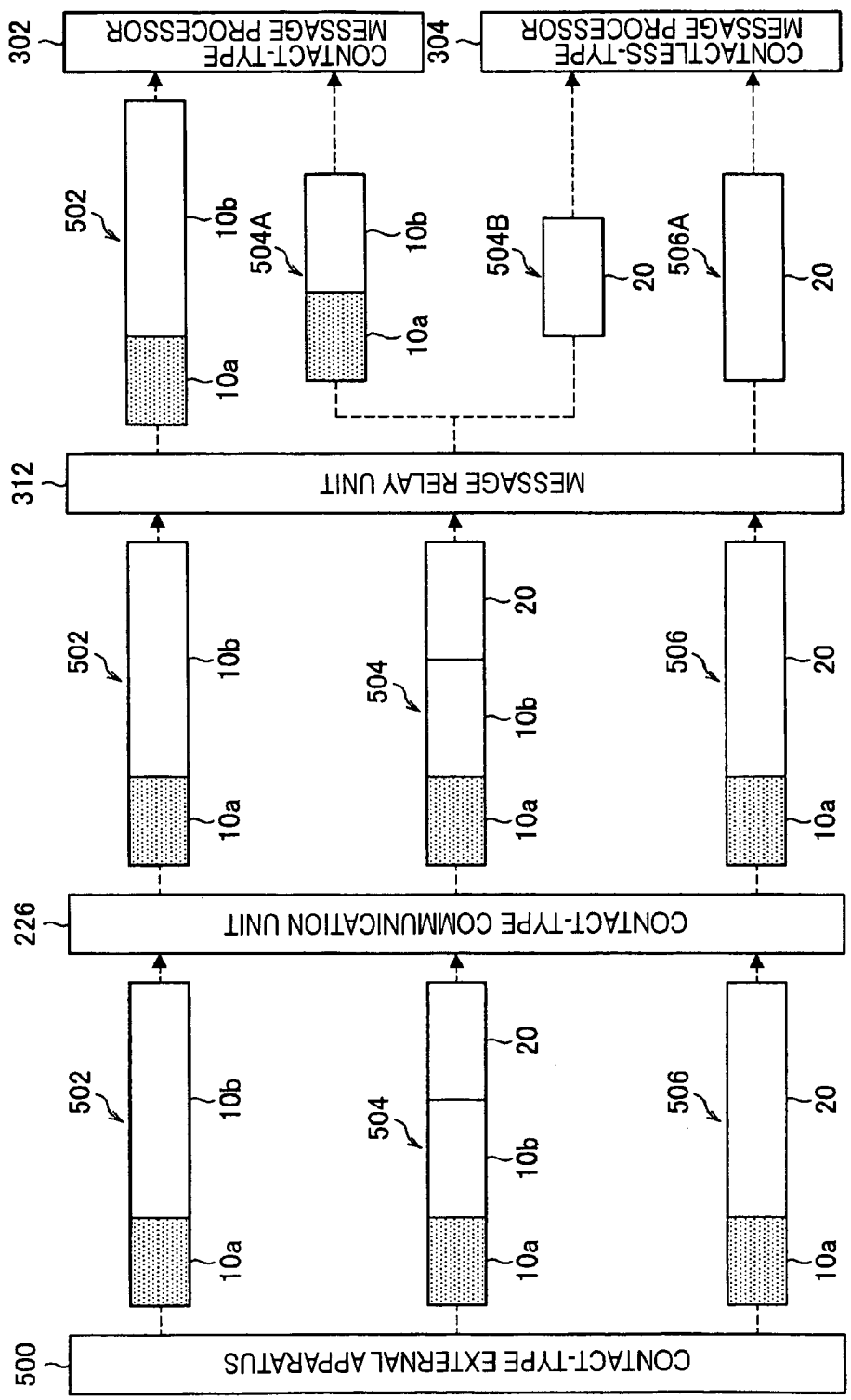

SEMICONDUCTOR INTEGRATED CIRCUIT, MOBILE MODULE, AND MESSAGE COMMUNICATION METHOD

BACKGROUND OF THE INVENTION

1. Field of the Invention

The present invention relates to a semiconductor integrated circuit, a mobile module, and a message communication method.

2. Description of the Related Art

Semiconductor integrated circuits having a communication function to communicate with an external apparatus in a contact state have been developed. IC (integrated circuit) cards containing such a semiconductor integrated circuit are typically used as credit cards in business fields. Other types of developed integrated circuits can communicate with an external apparatus in a contactless manner or in a state in which the circuit and the external apparatus are physically in contact with each other but with no direct electrical connection established. An IC card containing such a semiconductor integrated circuit is typically used in station ticket gates.

Recently-developed dual-interface, IC cards having contactless and contact communication functions permit selectively the contactless communication and the contact communication with the external apparatus, as disclosed in Japanese Unexamined Patent Application Publication No. 2003-168092. Such an IC card complies with transmission protocols specified in International Standard ISO/IEC7816-3 for contact communications and International Standard ISO/IEC14443-4 for contactless communications. Although the transmission protocols are different from the contact communication and the contactless communication, the IC card stores command information in a volatile memory to be referenced by a system program or a plurality of application programs of the IC card when the IC card receives a command. The IC card thus receives the protocol difference so that the received command is reliably performed regardless of which protocol is received.

Although the transmission protocol is different from the contact communication to the contactless communication, the command to be transferred from the external apparatus to the IC card is standardized in International Standard ISO/IEC7816-4 and is common to both the contact communication and the contactless communication. In other words, the IC card is based on the assumption that the contact communication standard and the contactless communication standard are identical to each other in the structure of messages including command messages and response messages exchanged between the external apparatus and the IC card. If the message structure is different from the contact communication to the contactless communication, the IC is unable to process each other's messages.

SUMMARY OF THE INVENTION

Accordingly, it is an object of the present invention to provide a semiconductor integrated circuit, a mobile module, and a message communication method for processing messages even if the structure of messages is different from a contact communication to a contactless communication.

A semiconductor integrated circuit having a function to communicate a message with an external apparatus in a contact communication and a function to communicate a message with the external apparatus in a contactless communication is thus provided. According to a first aspect of the present invention, a semiconductor integrated circuit includes a unit for determining whether a contactless-type message to be acquired in the contactless communication from the external apparatus is contained in a contact-type message acquired in the contact communication from the external apparatus and for extracting the contactless-type message from the contact-type message if it is determined that the contactless-type message is contained in the contact-type message and a unit for determining whether a contact-type message to be acquired in the contact communication from the external apparatus is contained in a contactless-type message acquired in the contactless communication from the external apparatus and for extracting the contact-type message from the contactless-type message if it is determined that the contact-type message is contained in the contactless-type message.

In the contact communication, an interface in contact with the external apparatus supplies power to the semiconductor integrated circuit of the present invention while receiving a message from the external apparatus to transfer the message to the semiconductor integrated circuit. In the contactless communication, the interface is out of contact with the external apparatus or has no direct electrical contact with the external apparatus even if both are in physical contact with each other.

In accordance with the present invention, the semiconductor integrated circuit processes the contactless-type message by extracting the contactless-type message from the contact-type message acquired from the external apparatus in the contact communication. The semiconductor integrated circuit processes the contact-type message by extracting the contact-type message from the contactless-type message acquired from the external apparatus in the contactless communication.

A message processor in a semiconductor integrated circuit or another semiconductor integrated circuit can understand only the contactless-type message different in structure from the contact-type message, and the external apparatus can transmit only the contact-type message. In such a case, the semiconductor integrated circuit extracts the contactless-type message contained in the contact-type message and supplies the extracted contactless-type message to the message processor. The external apparatus can thus use the message processor. The same is true between a message processor that can understand only the contact-type message and an external apparatus that can only transmit a message in only the contactless-type message structure.

According to a second aspect of the present invention, a semiconductor integrated circuit communicating messages with an external apparatus in a contact communication and/or a contactless communication includes a contact-type communication unit for acquiring a contact-type message in the contact communication from the external apparatus, a contactless-type communication unit for acquiring a contactless-type message in the contactless communication from the external apparatus, a contact-type message processor for processing the contact-type message, a contactless-type message processor for processing the contactless-type message, and a message relay unit for acquiring the contact-type message from the contact-type communication unit to supply the contact-type message to the contact-type message processor and for acquiring the contactless-type message from the contactless-type communication unit to supply the contactless-type message to the contactless-type message processor.

Even when the contact-type message acquired in the contact communication from the external apparatus is different in structure from the contactless-type message acquired in the contactless communication from the external apparatus, the semiconductor integrated circuit can process both the contact-type message and the contactless-type message because the semiconductor integrated circuit incorporates both the contact-type message processor and the contact-type message processor. Processing a contact-type message means learning the content of the contact-type message in accordance with the format thereof. The contact-type message processor may perform a process in accordance with the learned content of the message and may cause another application to perform the process. Processing a contactless-type message means learning the content of the contactless-type message in accordance with the format thereof. The contactless-type message processor may perform a process in accordance with the learned content of the message and may cause another application to perform the process. Since the message relay unit is arranged between the contact-type message processor and the contactless-type message processor, each communication unit simply supplies a message to the message relay unit and does not need to determine to which message processor to supply a message.

Preferably, the message relay unit includes a message determiner, and the message determiner determines whether the contactless-type message to be supplied to the contactless-type message processor is contained in the contact-type message acquired from the contact-type communication unit. With this arrangement, the message replay unit sets a subsequent process differently depending on whether the contactless-type message is contained in the contact-type message. The contact-type message containing the contactless-type message may be generated by attaching an identifier identifying the contact-type message to the contactless-type message.

Preferably, the message determiner determines, based on data of a predetermined portion of the contact-type message acquired from the contact-type communication unit, whether the contactless-type message is contained in the contact-type message. With this arrangement, the message determiner simply references the data of the predetermined portion of the contact-type message. The determination process is thus speeded up.

Preferably, the message relay unit further includes a message extractor, and the message extractor extracts the contactless-type message contained in the contact-type message acquired from the contact-type communication unit. With this arrangement, the message relay unit supplies the contactless-type message that is extracted by the message extractor from the contact-type message to the contactless-type message processor. The contactless-type message contained in the contact-type message may be part thereof. If the contactless-type message extracted from the contact-type message is part thereof and incomplete, the message extractor may add a deficient portion to the incomplete contactless-type message to produce a complete contactless-type message.

Preferably, the message relay unit preferably includes a message determiner, and the message determiner determines whether the contact-type message to be supplied to the contact-type message processor is contained in the contactless-type message acquired from the contactless-type communication unit. With this arrangement, the message replay unit sets a subsequent process differently depending on whether the contact-type message is contained in the contactless-type message. The contactless-type message containing the contact-type message may be generated by attaching an identifier identifying the contactless-type message to the contact-type message.

Preferably, the message determiner determines, based on data of a predetermined portion of the contactless-type message acquired from the contactless-type communication unit, whether the contact-type message is contained in the contactless-type message. With this arrangement, the message determiner simply references the data of the predetermined portion of the contactless-type message. The determination process is thus speeded up.

Preferably, the message relay unit further includes a message extractor, and the message extractor extracts the contact-type message contained in the contactless-type message acquired from the contactless-type communication unit. With this arrangement, the message relay unit supplies the contact-type message that is extracted by the message extractor from the contactless-type message to the contact-type message processor. The contact-type message contained in the contactless-type message may be part thereof. If the contact-type message extracted from the contactless-type message is part thereof and incomplete, the message extractor may add a deficient portion to the incomplete contact-type message to produce a complete contact-type message.

Preferably, the message relay unit includes a message determiner, and the message determiner determines whether the contactless-type message to be supplied to the contact-less-type message processor is contained in the contact-type message acquired from the contact-type communication unit, and determines whether the contact-type message to be supplied to the contact-type message processor is contained in the contactless-type message acquired from the contactless-type communication unit. With this arrangement, the message replay unit sets a subsequent process differently depending on whether the contactless-type message is contained in the contact-type message, while setting a subsequent process differently depending on whether the contact-type message is contained in the contactless-type message.

Preferably, the message relay unit further comprises a message extractor, and the message extractor extracts the contactless-type message contained in the contact-type message acquired from the contact-type communication unit, while extracting the contact-type message contained in the contactless-type message acquired from the contactless-type communication unit. With this arrangement, the message relay unit supplies the contactless-type message that is extracted by the message extractor from the contact-type message to the contactless-type message processor, while supplying the contact-type message that is extracted by the message extractor from the contactless-type message to the contact-type message processor.

The semiconductor integrated circuit of the present invention processes both the contact-type message and the contactless-type message not only when the contact-type message and the contactless-type message are different in structure, but also when contact-type message and the contactless-type message are identical in structure.

According to a third aspect of the present invention, a mobile module includes a semiconductor integrated circuit communicating messages with an external apparatus in a contact communication and/or a contactless communication. The semiconductor integrated circuit includes a unit for determining whether a contactless-type message to be acquired in the contactless communication from the external apparatus is contained in a contact-type message acquired in the contact communication from the external apparatus and for extracting the contactless-type message from the contact-type message if it is determined that the contactless-type message is contained in the contact-type message and a unit for determining whether a contact-type message to be acquired in the contact communication from the external apparatus is contained in a contactless-type message acquired in the contactless communication from the external apparatus and for extracting the contact-type message from the contactless-type message if it is determined that the contact-type message is contained in the contactless-type message.

The mobile module having the semiconductor integrated circuit therewithin extracts the contactless-type message contained in the contact-type message that is acquired in the contact communication from the external apparatus. The semiconductor integrated circuit thus processes the extracted contactless-type message. The semiconductor integrated circuit extracts the contact-type message contained in the contactless-type message that is acquired from the external apparatus in the contactless communication.

The mobile module has a size and weight permitting a user to easily carry it with him. The mobile module may house the semiconductor integrated circuit or may permit the semiconductor integrated circuit to be attached thereto. For example, the mobile module may be a terminal, such as an IC card, a cellular phone, or a PDA (personal digital assistant), or a wristwatch.

According to a fourth aspect of the present invention, a mobile module includes a semiconductor integrated circuit communicating messages with an external apparatus in a contact communication and/or a contactless communication. The semiconductor integrated circuit includes a contact-type communication unit for acquiring a contact-type message in the contact communication from the external apparatus, a contactless-type communication unit for acquiring a contactless-type message in the contactless communication from the external apparatus, a contact-type message processor for processing the contact-type message, a contactless-type message processor for processing the contactless-type message, and a message relay unit for acquiring the contact-type message from the contact-type communication unit to supply the contact-type message to the contact-type message processor and for acquiring the contactless-type message from the contactless-type communication unit to supply the contactless-type message to the contactless-type message processor.

Even when the contact-type message that is acquired from the external apparatus in the contact communication by the mobile module is different in structure from the contactless-type message that is acquired from the external apparatus in the contactless communication, the mobile module processes both the contact-type message and the contactless-type message using the semiconductor integrated circuit that includes the contact-type message processor and the contactless-type message processor. Since the message relay unit is arranged between the contact-type message processor and the contactless-type message processor, each communication unit simply supplies a message to the message relay unit and does not need to determine which message processor to supply a message.

The present invention in a fifth aspect relates to a message communication method performed between a mobile module communicating messages with an external apparatus in a contact communication and/or a contactless communication and an external contact-type apparatus for communicating messages with the mobile module in a contact communication. The message communication method includes steps of embedding a contactless-type message, to be transmitted to the mobile module in the contactless communication, in a contact-type message to be transmitted to the mobile module in the contact communication, transmitting the contact-type message containing the contactless-type message to the mobile module, receiving the contact-type message containing the contactless-type message, determining whether the contactless-type message is contained in the received contact-type message, and extracting the contactless-type message contained in the received contact-type message.

Even when the contact-type message that is transmitted from the external apparatus to the mobile module in the contact communication is different in structure from the contactless-type message that is transmitted from the external apparatus to the mobile module in the contactless communication, the external apparatus can practically transmit the contactless-type message in the contact communication to the mobile module with the contactless-type message embedded in the contact-type message. The mobile module determines whether the contactless-type message is contained in the contact-type message received from the external apparatus in the contact communication and extracts the contactless-type message if the contactless-type message is contained in the contact-type message. The mobile module can thus process the contactless-type message.

The present invention in a sixth aspect relates to a message communication method performed between a mobile module communicating messages with an external apparatus in a contact communication and/or a contactless communication and an external contactless-type apparatus for communicating messages with the mobile module in a contactless communication. The message communication method includes steps of embedding a contact-type message, to be transmitted to the mobile module in the contact communication, in a contactless-type message to be transmitted to the mobile module in the contactless communication, transmitting the contactless-type message containing the contact-type message to the mobile module, receiving the contactless-type message containing the contact-type message, determining whether the contact-type message is contained in the received contactless-type message, and extracting the contact-type message contained in the received contactless-type message.

Even when the contact-type message that is transmitted from the external apparatus to the mobile module in the contact communication is different in structure from the contactless-type message that is transmitted from the external apparatus to the mobile module in the contactless communication, the external apparatus can practically transmit the contact-type message in the contactless communication to the mobile module with the contact-type message embedded in the contactless-type message. The mobile module determines whether the contact-type message is contained in the contactless-type message received from the external apparatus in the contactless communication and extracts the contactless-type message if the contact-type message is contained in the contactless-type message. The mobile module can thus process the contact-type message.

The semiconductor integrated circuit, the mobile module and the message communication method in accordance with embodiments of the present invention process messages even if the message communicated with the external apparatus in the contact communication is different in structure from the message communicated with the external apparatus in the contactless communication.

BRIEF DESCRIPTION OF THE DRAWINGS

FIGS. 4A and 4B illustrate a determination information memory in accordance with the embodiment of the present invention;

FIG. 5 illustrates a message process flow in accordance with the embodiment of the present invention;

DESCRIPTION OF THE PREFERRED EMBODIMENTS

Figure 1A:
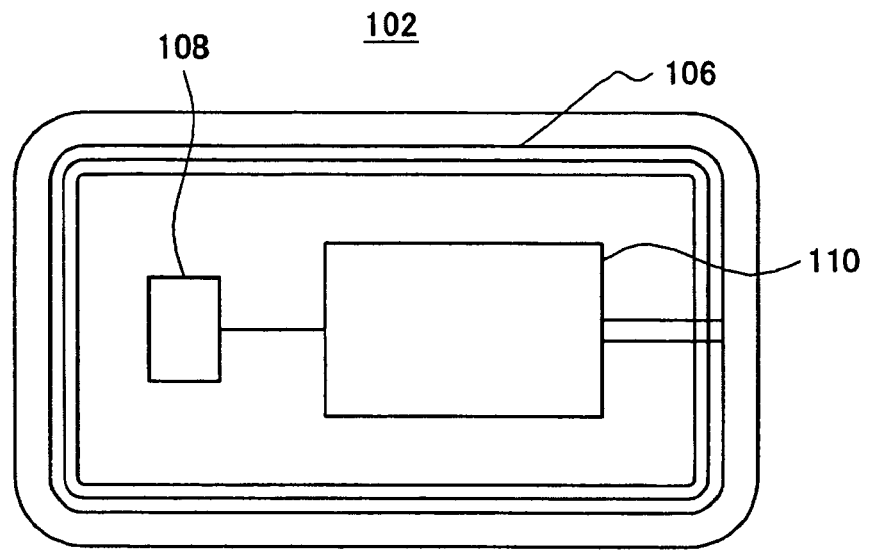
FIGS. 1A and 1B illustrate a mobile module in accordance with one embodiment of the present invention.

The embodiments of the present invention are described below with reference to the drawings. Throughout the specification and the drawings, like elements are designated with like reference numerals.

Figure 1B:
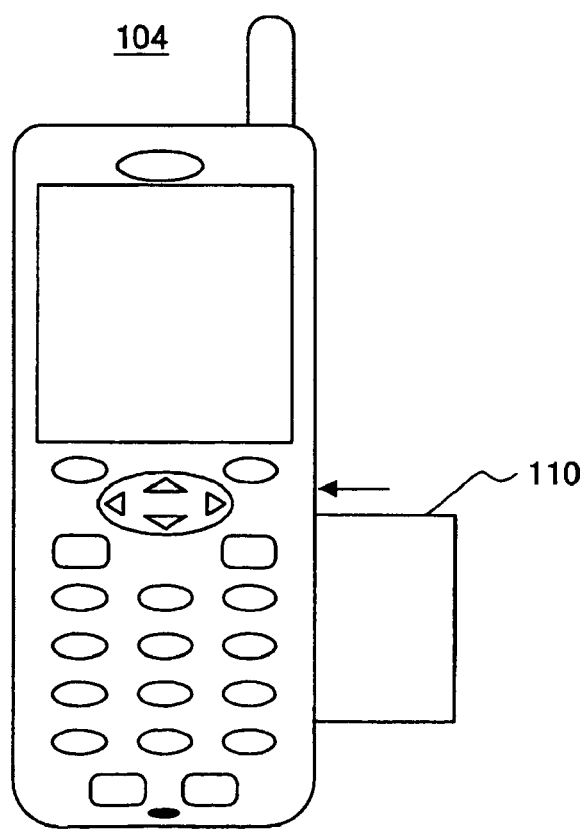

FIGS. 1A and 1B illustrate a mobile module containing a IC chip 110 incorporating a semiconductor integrated circuit of the present invention. The semiconductor integrated circuit can be incorporated as a single IC chip. Alternatively, the semiconductor integrated circuit may be divided into a plurality of IC chips distributed among a plurality of locations in the mobile module.

The mobile module preferably permits the IC chip 110 to be housed therewithin, or to be attached thereonto. The mobile module is properly sized and weighted for users to carry easily. The mobile module may be any of the IC card 102 of FIG. 1A, a cellular phone 104 of FIG. 1B, a wristwatch, a personal digital assistant (PDA), a gaming machine, fancy goods, such as a finger ring, etc.

The IC card 102 as the mobile module is described below. The IC card 102 includes an antenna coil 106, a contact terminal 108, and an IC chip 110. When the IC chip 110 or the IC card 102 communicates with an external apparatus in a contactless communication, the antenna coil 106 induces a voltage in response to a magnetic field generated by the external apparatus to operate the IC chip 110, and receives and transmits messages from and to the external apparatus. When the IC card 102 communicates with the external apparatus in a contact communication, the contact terminal 108 put into contact with a contact terminal of the external apparatus receives power from the external apparatus to operate the IC chip 110, and receives and transmits messages from and to the external apparatus.

The contact communication refers to a communication that is performed with the contact terminal of the mobile module placed in contact with the external apparatus. The contactless communication refers to a communication that is performed when the mobile module is not in contact with the external apparatus or when no electrical contact is established even if the mobile module and the external apparatus are physically in contact.

The external apparatuses include a contact-type external apparatus and a contactless-type external apparatus. The contact-type external apparatuses include a credit card reader, an onboard unit of an electronic collection system (ETC) or an automated teller machine (ATM) of banks, for example.

The contactless-type external apparatuses include an automatic ticket gate. Contactless communication between the contactless-type external apparatus and the mobile module is performed wirelessly. The contactless communication is performed within a short range of about 10 cm in accordance with the Near Field Communication (NFC) standard specifying a carrier radio frequency (RF) of 13.56 MHz at a data rate of 212 Kbps. Some external apparatuses have the contact and contactless communication capability.

When powered by the antenna coil 106, the IC chip 110 performs contactless communication with the external apparatus. When powered from the contact terminal 108, the IC chip 110 performs contact communication with the external apparatus. The contact communication and the contactless communication will be discussed in more detail later.

Figure 2:
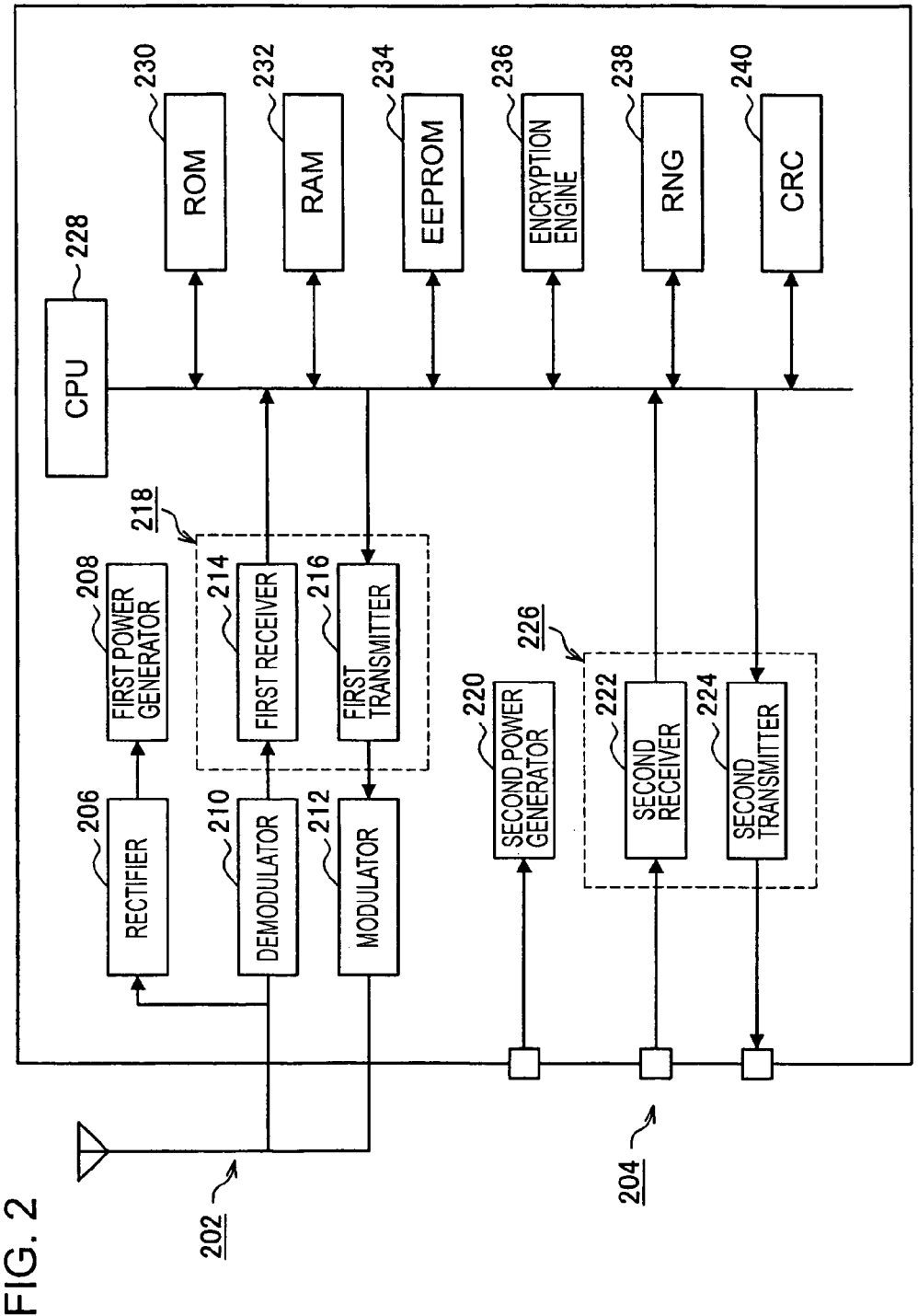
FIG. 2 is a block diagram of an IC chip in accordance with the embodiment of the present invention.

The mobile module containing the IC chip 110 has been roughly discussed. The IC chip 110 is now described with reference to FIG. 2.

The IC chip 110 includes a rectifier 206, a first power generator 208, a demodulator 210, a modulator 212, a first receiver 214, a first transmitter 216, a second power generator 220, a second receiver 222, a second transmitter 224, a CPU (central processing unit) 228, a ROM (read-only memory) 230, a RAM (random-access memory) 232, an EEPROM (electrically erasable and programmable read-only memory) 234, an encryption engine 236, a RNG (random number generator) 238, a CRC (cyclic redundancy check) unit 240, etc.

The rectifier 206 rectifies an alternating current voltage supplied from a contactless interface 202, such as the above-referenced coil, and supplies the rectified voltage to the first power generator 208. The first power generator 208 supplied with the voltage generates a power source voltage to be used by the IC chip 110. The demodulator 210 demodulates a signal received from the external apparatus via the contactless interface 202 into an electrical signal processable by the IC chip 110, and supplies the electrical signal to the first receiver 214. The modulator 212 modulates an electrical signal, to be transmitted from the IC chip 110 to the external apparatus via the contactless interface 202, into a signal transmittable in the contactless communication. The first receiver 214 and the first transmitter 216 function as a contactless-type communication unit 218 that communicates contactless-type messages with the external apparatus in the contactless communication. The function of the contactless-type communication unit 218 will be described later.

The second power generator 220 is powered by the external apparatus via a contact interface 204, such as the previously-mentioned contact terminal, and generates a source power for use by the IC chip 110. The second receiver 222 and the second transmitter 224 function as a contact-type communication unit 226 that acquires contact-type messages from the external apparatus in the contact communication. The function of the contact-type communication unit 226 will be described later.

The CPU 228 operates from the source power generated by one of the first power generator 208 and the second power generator 220 in the IC chip 110 and generally controls the entire IC chip 110. The ROM 230 is a non-volatile memory, which stores a variety of applications, and an operating system (OS) serving as a platform.

The OS stored in the ROM 230 analyzes commands received by the IC chip 110 from the external apparatus and performs a process in response to the command message. Also, the OS causes another application to perform the process, thereby generating a response message as a process result to be transmitted to the external apparatus.

Since the IC chip 110 of this embodiment of the present invention receives a contact-type command message, as one form of the contact-type message, supplied in the contact communication from the external apparatus, and a contactless-type command message, as one form of the contactless-type message, supplied in the contactless communication, the OS needs to understand the two type of command messages. If both the contact-type command message and the contactless-type command message have the same and common structure defined in Standard ISO/IEC7816-4, it is sufficient if the OS understands the common command, and a single OS is sufficient.

As will be discussed later, the IC chip 110 is designed on the assumption that the contact-type command message and the contactless-type command message are different in structure. In accordance with the present embodiment, the contact-type command message has a structure that complies with the Standard ISO/IEC7816-4, but the contactless-type command message has a structure that does not comply with the Standard ISO/IEC7816-4. Conversely, the contact-type command message may not comply with the Standard ISO/IEC7816-4, but the contactless-type command message may comply with the Standard ISO/IEC7816-4. Alternatively, both the contact-type command message and the contactless-type command message may not comply with the Standard ISO/IEC7816-4. One OS understanding the contact-type command message and the other OS understanding the contactless-type command message are required. In accordance with the present embodiment, the OS understanding the contact-type command message is referred to as a contact-type message processor and the other OS understanding the contactless-type command message is referred to as a contactless-type message processor.

The RAM 232 stores the operating systems and data temporarily used by each application. The EEPROM 234 is mainly used to store user data, but it may store the applications and the OS, as well. A flash memory may be used instead of the EEPROM 234. The encryption engine 236 encrypts and decrypts data exchanged with the external apparatus. The RNG 238 generates a random number for use in an encryption key. The CRC unit 240 performs a cyclic redundancy check, namely, an error check, on data received from the external apparatus.

Figure 3:
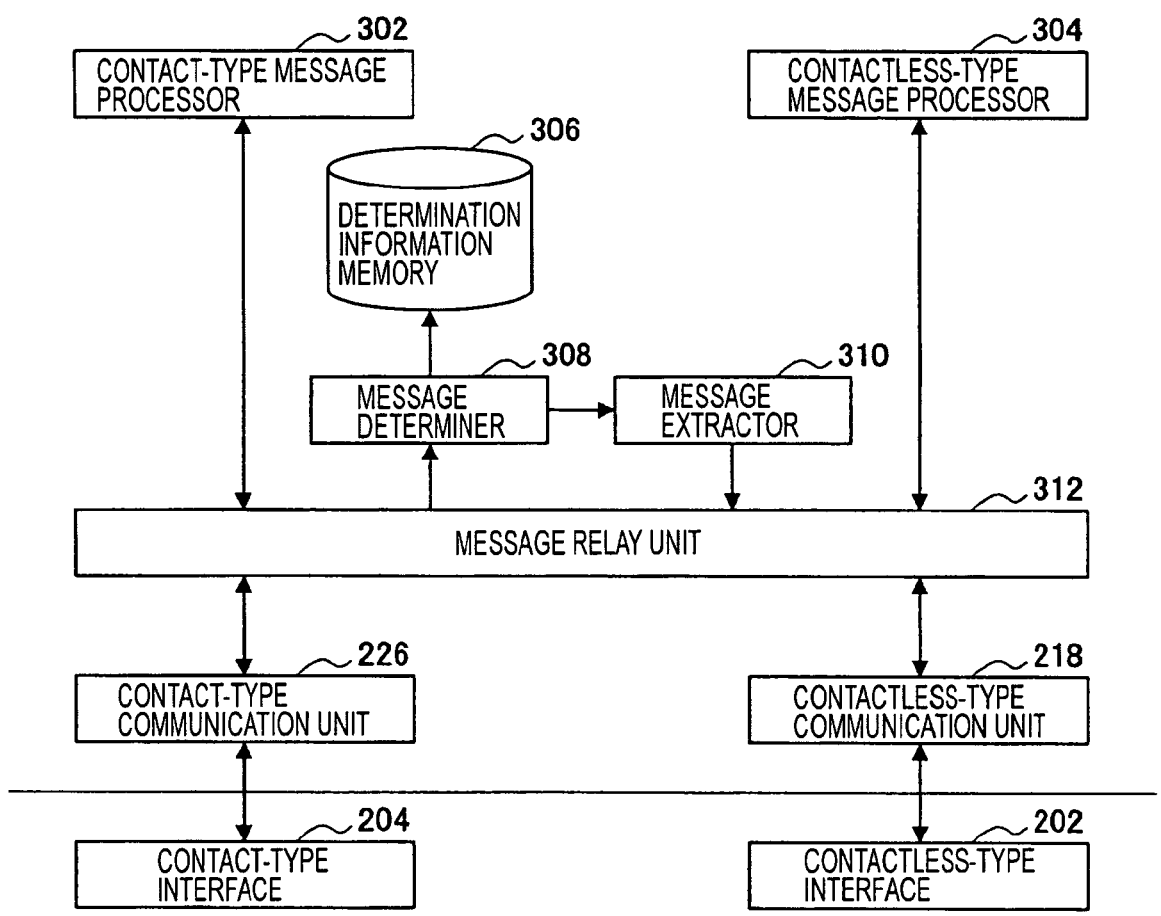
FIG. 3 is a functional block diagram of the IC chip in accordance with the embodiment of the present invention.

The IC chip 110 has been discussed. A functional structure of the IC chip 110 is described below with reference to FIG. 3.

The IC chip 110 includes a contact-type message processor 302 for processing a contact-type message and a contactless-type message processor 304 for processing a contactless-type message. More specifically, the contact-type message processor 302 is an OS that understands the contact-type command message and performs a process responsive to the command message, or causes another application to perform the process to transmit a response message as the process result to the external apparatus. The contactless-type message processor 304 is an OS that understands the contactless-type command message, performs a process responsive to the command message or causes another application to perform the process to transmit a response message as the process result to the external apparatus.

The contact-type command message to be understood by the contact-type message processor 302 is described below with reference to a portion of (a) of FIG. 6. The contact-type command message contains a header section 10*a* and a data section 10*b*. The header section 10*a* is an identifier identifying a contact-type message. The header section 10*a* is preferably placed at a fixed position within the contact-type command message, for example, at a zero byte of the contact-type message. A command representing the content of a process to be performed by the contact-type message processor 302 is contained in the header section 10*a*. More specifically, the header section 10*a* contains CLA 602 representing the type of a command message as to whether the message complies with the ISO/IEC7816-4 Standard, INS 604 representing the content of a command for a data acquisition and file selection, P1606 and P2608 representing parameters used when the contact-type message processor 302 executes the command indicated by INS 604, and Lc 610 representing the length of the data section 10*b*.

The data section 10*b* stores data that are written in the contact-type message processor 302 in response to a data update command and data used by the contact-type message processor 302 in the execution of commands. The contact-type command message may further store Le 612 designating a length of data that is acquired by the contact-type message processor 302 in the issue of a data acquisition command. Depending on the type of a command, Lc 610 and the data section 10*b* may be excluded from the contact-type command message.

The contactless-type command message to be understood by the contactless-type message processor 304 is described below with reference to FIG. 8A. The contactless-type command message contains a header section 20*a* and a data section 20*b*. The header section 20*a* is an identifier identifying a contactless-type message. The header section 20*a* is preferably arranged at a fixed position within the contactless-type command message, for example, at a zero byte of the contactless-type message. The header section 20*a* contains the content of a command to be performed by the contactless-type message processor 304. More specifically, the header section 20*a* contains Sync 802 that is synchronization information required for the contactless communication with the external apparatus, Len 804 representing a length of data, and CD 806 representing a type and content of a command.

The data section 20*b* stores data that are written onto the contactless-type message processor 304 in response to a data update command and data that is used by the contactless-type message processor 304 for executing the command. The contactless-type command message may additionally include CRC 808 as an error detecting code to the data section 20*b*. Depending on the content of a command, Len 804 and the data section 20*b* may be excluded from the contactless-type command message.

The structures of the command messages are discussed for exemplary purposes only. Different structures may be applied to the contact-type command message and the contactless-type command message. Returning to FIG. 3, the function and structure of IC chip 110 are described below.

The contact-type communication unit 226 acquires contact-type messages in the contact communication from the external apparatus. More specifically, the contact-type communication unit 226 receives the contact-type command message via a contact-type interface 204, such as the contact terminal. The contact-type communication unit 226 also transmits a response message responsive to the contact-type command message via the contact-type interface 204.

In the above arrangement, the contact-type command message received by the contact-type communication unit 226 from the external apparatus is understood and then processed by the contact-type message processor 302. A contactless-type command message can be contained in the above-described contact-type command message. The external apparatus embeds the contactless-type command message in the contact-type command message and transmits the command message in the contact communication to the IC chip 110 as a contact-type command message. In this arrangement, an external apparatus having only a contact communication capability is still able to transmit to the IC chip 110 a command that can be transmitted by only an external apparatus having a contactless communication capability.

The example of the contact-type command message containing the contactless-type command message is described below with reference to portions (b) and (c) of FIG. 6. As shown, a contactless-type command message 20 is contained in the contact-type command message shown in the portion (a) of FIG. 6. As shown in the portion (b) of FIG. 6, the header section 10a and the data section 10b in the contact-type command message are followed by the contactless-type command message 20. The contact-type command message 10 of the portion (b) of FIG. 6 includes a command to be executed by the contact-type message processor 302 and data to be used by the contact-type message processor 302 in the execution of the command and the contactless-type command message 20. Even if the command to be executed by the contact-type message processor 302 and the contactless-type command message 20 are contained, the data section 10b may be sometimes contained.

Figure 6:
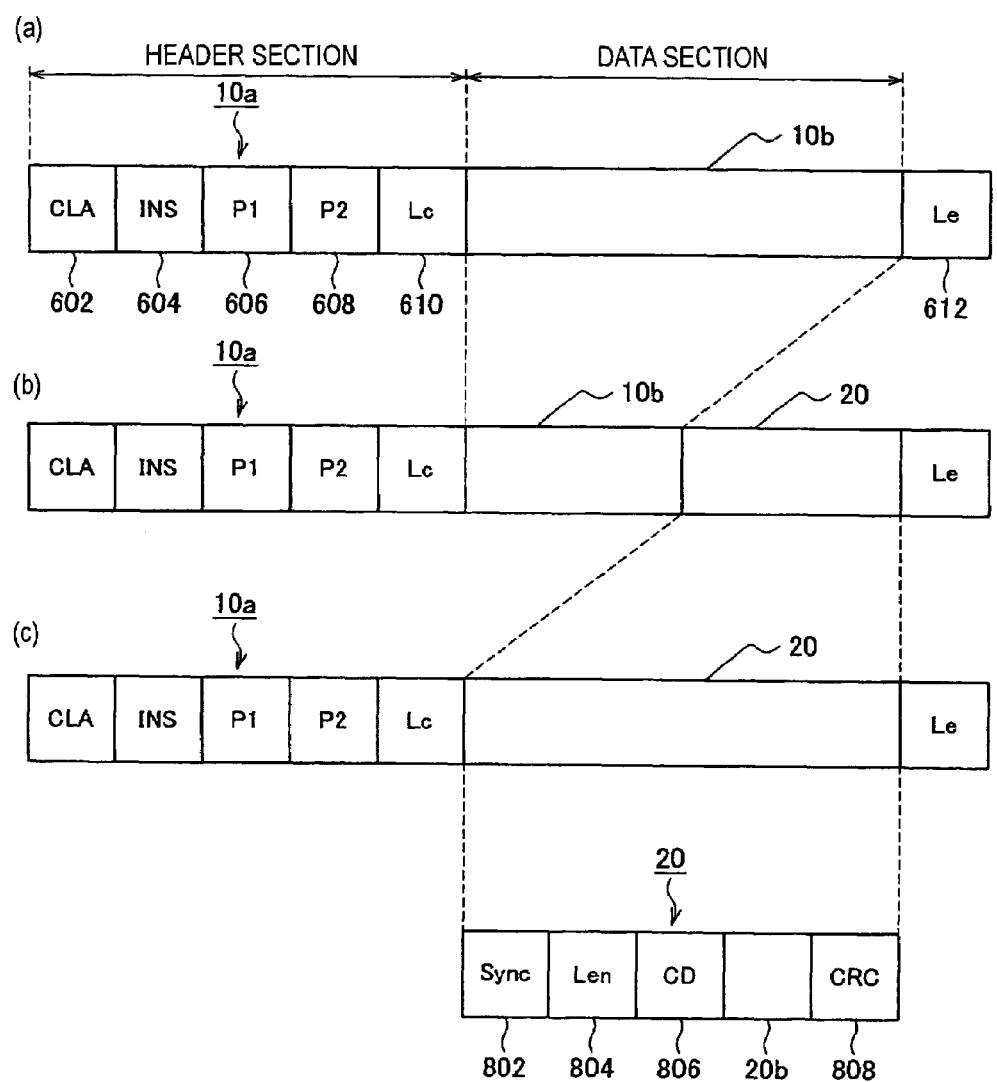
FIG. 6 illustrates a structure of a contact-type message in accordance with the embodiment of the present invention.

As shown in the portion (c) of FIG. 6, the header section 10a is followed by the contactless-type command message 20. The contact-type command message shown in the portion (c) of FIG. 6 does not contain a command to be executed by the contact-type message processor 302 and data to be used by the contact-type message processor 302 in the execution of the command. The contactless-type command message contained in the contact-type command message may have the same structure as the contactless-type command message shown in the portion (a) of FIG. 8, may have a portion of the contactless-type command message, or may have the contactless-type command message in the compressed form thereof.

For convenience of explanation, the contact-type command message containing the contactless-type command message of the portions (b) and (c) of FIG. 6 is referred to as a virtual contact-type command message.

The virtual contact-type command message can be communicated by the contact-type communication unit 226 because the virtual contact-type command message is generally in compliance with the format of the contact-type command message with the header section 10a identifying the contact-type command message arranged at a fixed position.

The contactless-type communication unit 218 acquires the contactless-type command message from the external apparatus in the contactless communication. More specifically, the contactless-type communication unit 218 receives the contactless-type command message from the external apparatus via the contactless-type interface 202, such as the antenna coil. The contactless-type communication unit 218 transmits a response message responsive to the contactless-type command message to the external apparatus via the contactless-type interface 202.

The contactless-type command message received by the contactless-type communication unit 218 from the external apparatus has the previously-discussed structure that is understood and processed by the contactless-type message processor 304. The contactless-type command message having the above-referenced structure can contain the contact-type command message. More specifically, the external apparatus can embed the contact-type command message in the contactless-type command message and transmit the command message to the IC chip 110 in the contactless communication as a contactless-type command message. In this way, an external apparatus having only the contactless communication capability still can transmit to the IC chip 110 a command that is to be transmitted by an external apparatus having the contact communication capability.

An example of the contactless-type command message containing the contact-type command message is described below with reference to FIG. 8. As shown in portions (b) and (c) of FIG. 8, a contact-type command message 10 is contained in the contactless-type command message shown in the portion (a) of FIG. 8. As shown in the portion (c) of FIG. 8, the header section 20a and the data section 20b in the contactless-type command message are followed by the contact-type command message 10. The contactless-type command message shown in the portion (c) of FIG. 8 contains a command to be performed by the contactless-type message processor 304, data to be used by the contactless-type message processor 304 in the execution of the command and the contact-type command message 10. Even if the command to be performed by the contactless-type message processor 304 and the contact-type command message 10 are contained, the data section 20b may not be contained sometimes.

Figure 8:
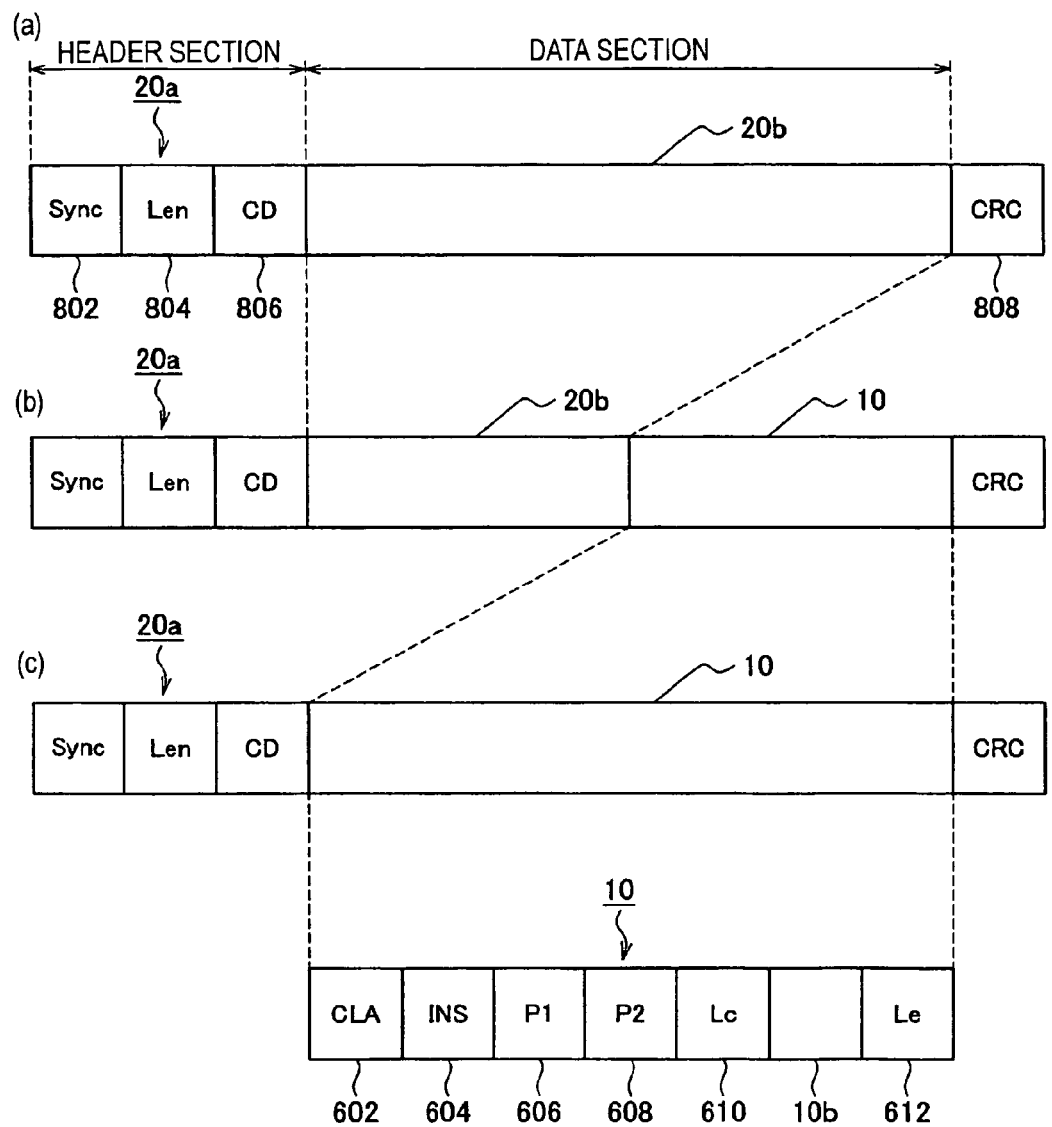
FIG. 8 illustrates a structure of a contactless-type message in accordance with the embodiment of the present invention.

As shown in the portion (c) of FIG. 8, the header section 20a in the contactless-type command message is followed by the contact-type command message 10. The contactless-type command message shown in the portion (c) of FIG. 8 contains the contact-type command message 10 but does not contain the command to be processed by the contactless-type message processor 304 and the data used in the execution of the command. The contact-type command message contained in the contactless-type command message may have the same structure as the contact-type command message discussed with reference to the portion (a) of FIG. 6 or may have only a portion of the contact-type command message.

For convenience of explanation, the contactless-type command message contained in the contact-type command message shown in the portions (b) and (c) of FIG. 8 is referred to as a virtual contactless-type command message.

The virtual contactless-type command message can be communicated by the contactless-type communication unit 218 because the virtual contactless-type command message is generally in compliance of the format of the contactless-type command message with the header section 20a identifying the contactless-type command message arranged at a fixed position.

The message relay unit 312 acquires the contact-type command message from the contact-type communication unit 226 and supplies the acquired contact-type command message to the contact-type message processor 302. The message relay unit 312 acquires the contactless-type command message from the contactless-type communication unit 218 and supplies the acquired contactless-type command message to the contactless-type message processor 304. More specifically, the message relay unit 312 receives from the contact-type communication unit 226 the contact-type command message including the virtual contact-type command message and supplies only the contact-type command message understandable by the contact-type message processor 302 to the contact-type message processor 302. The message relay unit 312 receives the contactless-type command message including the virtual contactless-type command message and supplies only the contactless-type command message understandable by the contactless-type message processor 304 to the contactless-type message processor 304.

Also, the message relay unit 312 supplies the contactless-type message processor 304 with the contactless-type command message contained in the virtual contact-type command message to cause the contactless-type message processor 304 to process the contactless-type command message. The message relay unit 312 supplies the contact-type message processor 302 with the contact-type command message contained in the virtual contactless-type command message to cause the contact-type message processor 302 to process the contact-type command message. The message relay unit 312, including a message determiner 308 and a message extractor 310, processes the virtual contact-type command message and the virtual contactless-type command message.

The message determiner 308 determines whether the contactless-type command message to be supplied to the contactless-type message processor 304 is contained in the contact-type command message acquired from the contact-type communication unit 226. In other words, the message determiner 308 determines whether the contact-type command message is a virtual contact-type command message. To this end, the message determiner 308 references a predetermined portion of the contact-type command message, such as CLA 602 representing the type of the command and INS 604 representing the content of the command in the header section 10a in the contact-type command message.

The message determiner 308 determines whether the contact-type command message to be supplied to the contact-type message processor 302 is contained in the contactless-type command message acquired by the message relay unit 312 from the contactless-type communication unit 218. In other words, the message determiner 308 determines whether the contactless-type command message is a virtual contactless-type command message. To this end, the message determiner 308 references a predetermined portion of the contactless-type command message, such as CD 806 representing the content of the command in the header section 20a in the contactless-type command message.

Determination criteria can be stored beforehand in the ROM or EEPROM. A determination information memory 306 stores such determination criteria, and it is described below with reference to FIGS. 4A and 4B.

The determination information memory 306 includes a contact-type command message definition table 402 defining the contact-type command message and a contactless-type command message definition table 412 defining the contactless-type command message. The contact-type command message definition table 402 is described first. The contact-type command message definition table 402 includes a CLA column 406, an INS column 408, and a command column 410. The command column 410 stores the content of a command that is defined by a combination of data stored in the CLA column 406 and the INS column 408.

As shown in FIGS. 4A and 4B, for example, the contact-type command message definition table 402 is defined as follows: the contact-type command message contains the contactless-type command message if the CLA column 406 has "XX", and a command to be processed by the contact-type message processor 302 is not contained if the CLA column 406 has "XX" and the INS column 408 has "FF". The contact-type command message definition table 402 is further defined as follows: the contactless-type command message and a command to be processed by the contact-type message processor 302 are contained if the CLA column 406 has "XX" and the INS column 408 has any setting other than "FF". Such a definition is used as the determination criteria in the determination of whether the contact-type command message is a virtual contact-type command message.

The contactless-type command message definition table 412 is described below. The contactless-type command message definition table 412 contains a CD column 414 and a command column 416. The command column 416 stores the content of a command defined by data stored in the CD column 414. As the contact-type command message definition table 402, the contactless-type command message definition table 412 can use the definition of the command column 416 by the data in the CD column 414 as the determination criteria as to the determination of whether the contactless-type command message is a virtual contactless-type command message.

If the message determiner 308 determines that the contact-type command message is a virtual contact-type command message, or if the message determiner 308 determines that the contactless-type command message is a virtual contactless-type command message, the message determiner 308 feeds the command message to the message extractor 310. Alternatively, an identifier, such as a message ID of the message, is stored in a particular file, or a flag of the message is set so that the message extractor 310 can identify the command message.

The message extractor 310 extracts the contactless-type command message from the contact-type command message supplied from the contact-type communication unit 226 to the message relay unit 312. More specifically, the message extractor 310 acquires the contactless-type command message contained in the virtual contactless-type command message and supplies the contactless-type command message to the message relay unit 312. The contactless-type command message in its incomplete form is permitted. For example, when the contact-type command message containing the contactless-type command message is transmitted, Sync 802 as the synchronization information is not needed and thus not transmitted altogether. An incomplete contact-type command message may be supplied as is or a deficient portion may be added to make a complete contact-type command message before being supplied. In such a case, data of the deficient portion may be stored in the ROM 230.

The message extractor 310 extracts the contact-type command message contained in the contactless-type command message supplied from the contactless-type communication unit 218 to the message relay unit 312. More specifically, the message extractor 310 acquires the contact-type command message contained in the virtual contactless-type command message and supplies contact-type command message to the message relay unit 312. If the contact-type command message is not in its complete form, a deficient portion may be added thereto before being supplied.

The message relay unit 312 thus constructed acquires the contact-type command message from the contact-type communication unit 226 and causes the message determiner 308 to determine whether the contact-type command message is a virtual contact-type command message. If it is determined that the contact-type command message is not a virtual contact-type command message, the message relay unit 312 supplies the contact-type command message to the contact-type message processor 302 as is. If it is determined that the contact-type command message is a virtual contact-type command message, the message relay unit 312 causes the message extractor 310 to extract the contactless-type command message contained therewithin and supplies the contactless-type command message to the contactless-type message processor 304. If the virtual contact-type command message contains a command to be processed by the contact-type message processor 302, the message extractor 310 supplies the contact-type message processor 302 with the contact-type command message from which the message extractor 310 has extracted the contactless-type command message.

The message relay unit 312 sorts the contact-type command messages containing the virtual contact-type command message between one for the contact-type message processor 302 and one for contactless-type message processor contactless-type message processor 304. Such a process of the message relay unit 312 is described below with reference to FIG. 5.

Reference numerals 502, 504, and 506 diagrammatically show contact-type command messages transmitted to the IC chip 110 from an external apparatus 500 that performs the contact communication. The first message 502 is composed of a header section 10*a* and a data section 10*b* in the contact-type command message. The second message 504 is composed of the header section 10*a*, the data section 10*b* and a contactless-type command message 20. The second message 504 is a virtual contact-type command message. A third message 506, composed of a header section 10*a* and a contactless-type command message 20, is a virtual contact-type command message.

The message relay unit 312 acquires one of the first message 502, the second message 504, and the third message 506 and performs a process responsive to the acquired message. The first message 502 is supplied to the contact-type message processor 302 as is. The second message 504 as the contactless-type command message contains a command to be processed by the contact-type message processor 302 and a contactless-type command message and is divided into a second message 504A as a command portion to be processed by the contact-type message processor 302 and a second message 504B as the contactless-type command message. The second message 504A and the second message 504B are respectively supplied to the contact-type message processor 302 and the contactless-type message processor 304. The third message 506 is the contact-type command message containing only the contactless-type command message. The contactless-type command message 20 is supplied to the contactless-type message processor 304 as a third message 506A.

The message relay unit 312 acquires the contactless-type command message from the contactless-type communication unit 218 and causes the message determiner 308 to determine whether the contactless-type command message is a virtual contactless-type command message. If it is determined that the contactless-type command message is not a virtual contactless-type command message, the message relay unit 312 supplies the contactless-type command message to the contactless-type message processor 304. If it is determined that the contactless-type command message is a virtual contactless-type command message, the message relay unit 312 causes the message extractor 310 to extract the contact-type command message contained in the virtual contactless-type command message and supplies the contact-type command message to the contact-type message processor 302. If the virtual contactless-type command message contains a command to be processed by the contactless-type message processor contactless-type message processor 304, the message relay unit 312 supplies the contactless-type message processor 304 with the contactless-type command message from which the message extractor 310 has extracted the contact-type command message.

Figure 7:
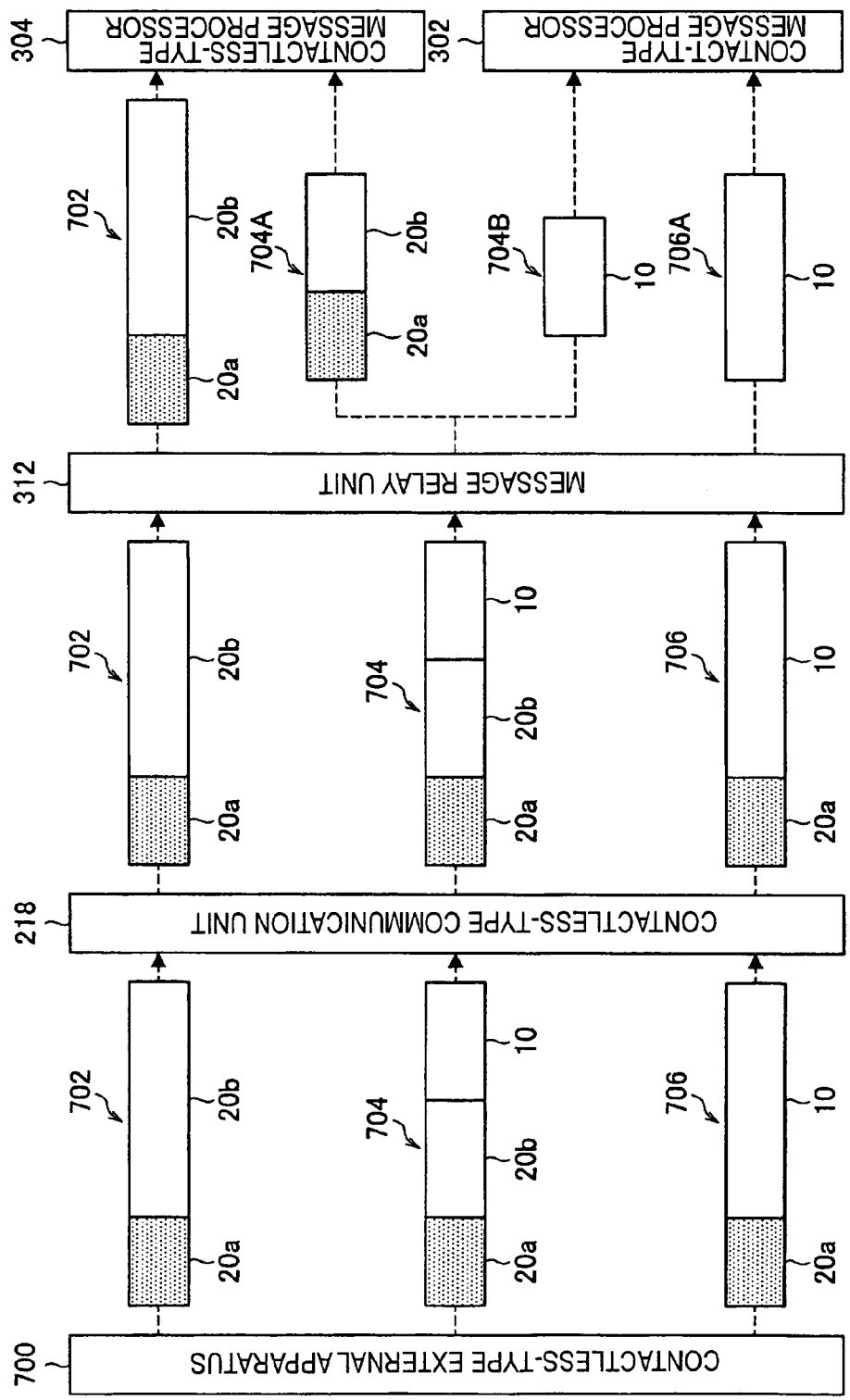
FIG. 7 illustrates a message process flow in accordance with the embodiment of the present invention.

The message relay unit 312 divides the contactless-type command message containing the virtual contactless-type command message between one for the contactless-type message processor 304 and one for the contact-type message processor 302. Such a process of the message relay unit 312 is described below with reference to FIG. 7.

Reference numerals 702, 704, and 706 diagrammatically show contactless-type command messages transmitted to the IC chip 110 from an external apparatus 700 that performs the contactless communication. The first message 702 is composed of the header section 20*a* and the data section 20*b* in the contactless-type command message. The second message 704, composed of the header section 20*a*, the data section 20*b*, and the contact-type command message 10, is a virtual contactless-type command message. The third message 706, composed of the header section 20*a* and the contact-type command message 10, is a virtual contactless-type command message.

The message relay unit 312 acquires one of the first message 702, the second message 704, and the third message 706 from the contactless-type communication unit 218 and performs a process responsive to the acquired process. The message relay unit 312 supplies the first message 702 to the contactless-type message processor 304 as is. The second message 704 as the virtual contactless-type command message, composed of a command to be processed by the contactless-type message processor contactless-type message processor 304 and the contact-type command message, is divided between a second message 704A as the command to be processed by the contactless-type message processor 304 and a second message 704B as the contact-type command message. The second message 704A and the second message 704B are respectively supplied to the contactless-type message processor 304 and the contact-type message processor 302. As for the third message 706 as the virtual contactless-type command message containing only the contact-type command message, the contact-type command message 10 is supplied to the contact-type message processor 302 as a third message 706A.

Figure 9:
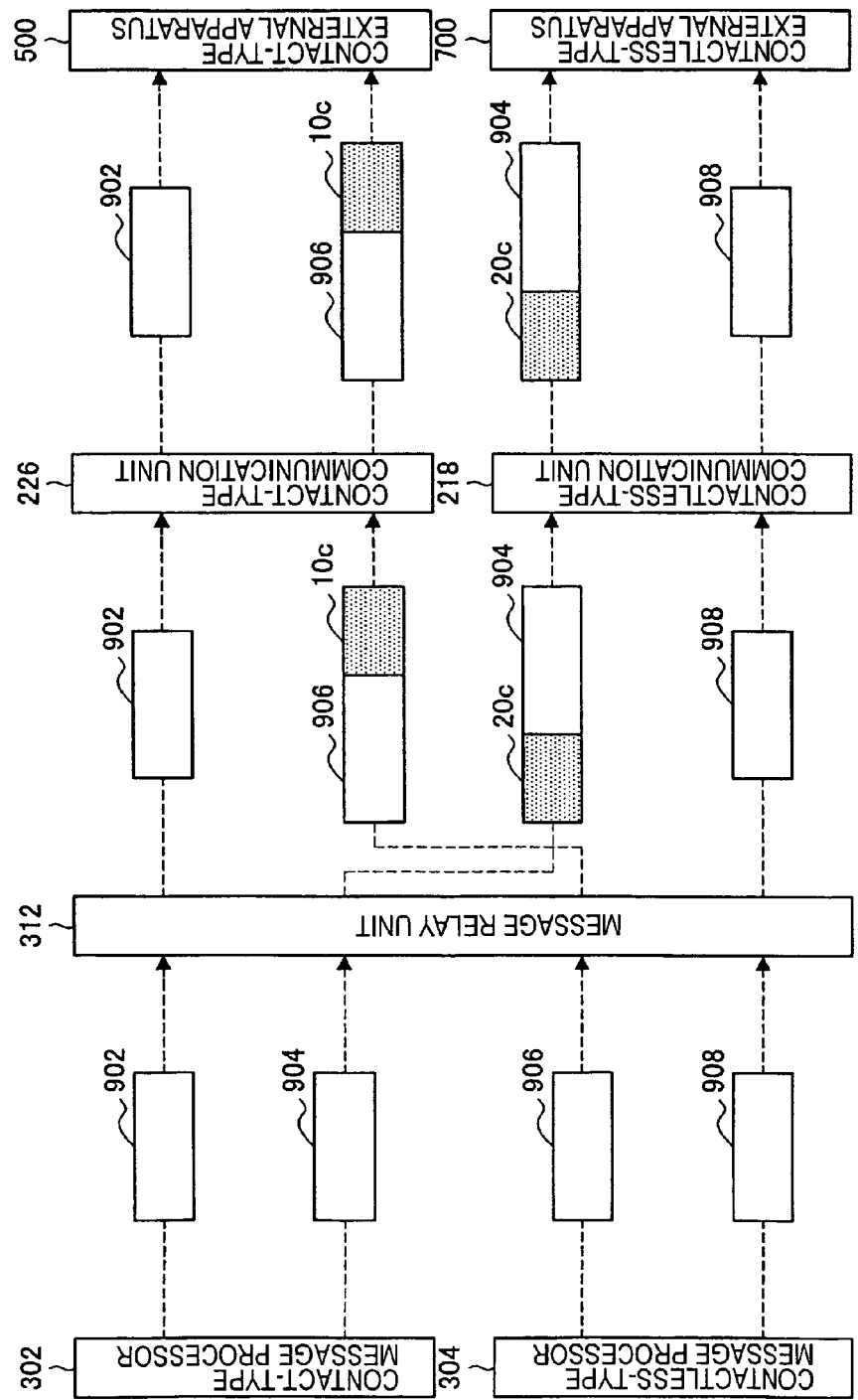
FIG. 9 illustrates a message process flow in accordance with the embodiment of the present invention.

The message relay unit 312 supplies command messages to the contact-type message processor 302 and the contactless-type message processor 304, receives response messages from each of the contact-type message processor 302 and the contactless-type message processor 304 in response to the command messages, and supplies the response messages to the contact-type communication unit 226 and the contactless-type communication unit 218 respectively. Such a process is described below with reference to FIG. 9.

The contact-type message processor 302 supplies the message relay unit 312 with the response message as a result of processing the contact-type command message. The contactless-type message processor 304 supplies the message relay unit 312 with the response message as a result of processing the contactless-type command message. Reference numerals 902, 904, 906, and 908 diagrammatically illustrate response messages. The message relay unit 312 converts the acquired messages into the messages in formats compatible with destinations.

More specifically, the first response 902, namely, a response message to be transmitted to the contact-type external apparatus 500 in the contact communication, is supplied to the contact-type communication unit 226 as is. The second response 904 is a response message to be transmitted to the external apparatus 700 in the contactless communication, and it needs to be converted to the format in the contactless communication. A header section 20c indicating a contactless-type response message is added to the second response 904 before the second response 904 is supplied to the contactless-type communication unit 218. When a response message is transmitted from the contact-type message processor 302 to the contactless-type external apparatus 700, a command message corresponding to the response message can be a contact-type command message contained in the virtual contactless-type command message transmitted from the contactless-type external apparatus 700.

The third response 906 is a response message to be transmitted to the contact-type external apparatus 500. The message relay unit 312 adds a header section 10c indicating a contact-type response message to the third response 906, thereby converting the third response 906 to a format compatible with the response message in the contact communication. The resulting response message is supplied to the contact-type communication unit 226. The fourth response 908 is a response message to be transmitted to the contactless-type external apparatus 700 in the contactless communication, and it is thus supplied to the contactless-type communication unit 218 as is.

The function of the message relay unit 312 can be transferred to the responsibility of the contact-type communication unit 226 or the contactless-type communication unit 218.

The function and structure of the IC chip 110 have been discussed. With the IC chip 110 thus constructed, each element of the IC chip 110 understands and processes each command message even if the contact-type command message and the contactless-type command message are different in structure. The message relay unit 312 processes the virtual contact-type command message and the virtual contactless-type command message as described above. Even when the external apparatus transmits a message in the contact communication to the IC chip 110, the IC chip 110 performs the same process that is applied to a message transmitted in the contactless communication. Even when the external apparatus transmits a message in the contactless communication to the IC chip 110, the IC chip 110 performs the same process that is applied to a message transmitted in the contact communication.

Figure 10:
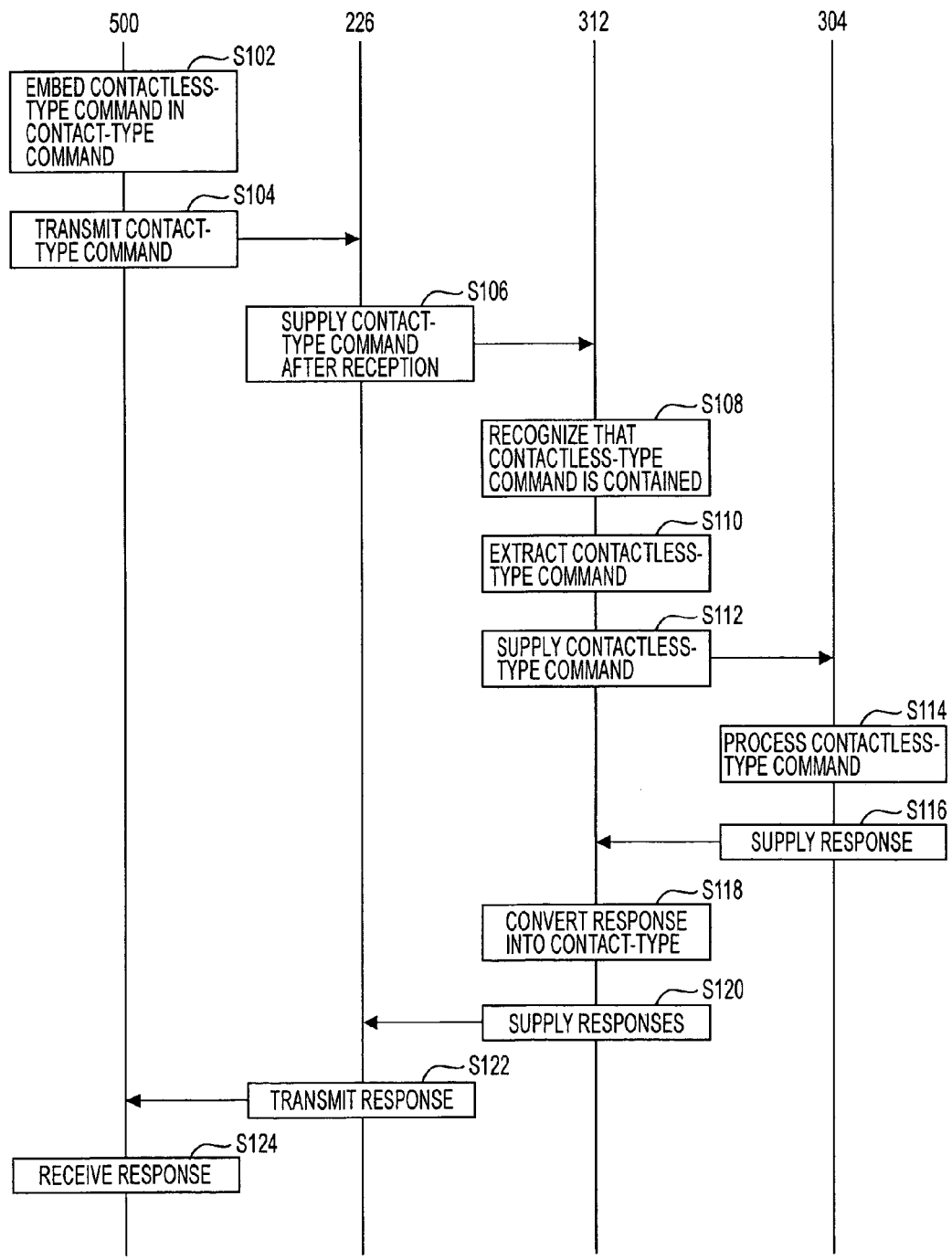
FIG. 10 is a timing diagram illustrating a message process flow performed between an external apparatus and an IC chip in accordance with the embodiment of the present invention.

A communication process flow of a virtual contact-type command message communicated between the contact-type external apparatus 500 and the IC chip 110 is described below with reference to FIG. 10.

In step S102, the contact-type external apparatus 500 embeds a contactless-type command message into a contact-type command message. In other words, a virtual contact-type command message is generated. In step S104, the virtual contact-type command message is transmitted to the contact-type communication unit 226 in the IC chip 110 in the contact communication. The contact-type communication unit 226 supplies the received virtual contact-type command message to the message relay unit 312 (step S106).

The message relay unit 312 recognizes that the acquired message is the virtual contact-type command message containing the contactless-type command message (step S108). The contactless-type command message is extracted from the virtual contact-type command message (step S110), and the extracted contactless-type command message is supplied to the contactless-type message processor 304 (step S112).

The contactless-type message processor 304 understands the acquired contactless-type command message and performs a process corresponding to the message (step S114), and it supplies a response message as a result of the process to the message relay unit 312 (step S116). Since the destination of the response message acquired from the contactless-type message processor 304 is the contact-type external apparatus 500, the message relay unit 312 modifies the format of the message to that of the contact-type response message (step S118) and supplies the resulting response message to the contact-type communication unit 226 (step S120). The destination of the response message is determined by referencing an identifier of the external apparatus as the destination of the command message. The identifier of the external apparatus may be stored in association with a message identifier of the command message when the message relay unit 312 receives the command message.

The contact-type communication unit 226 transmits the response message to the contact-type external apparatus 500 in the contact communication (step S122). The contact-type external apparatus 500 receives the response message (step S124), and the process ends.

Figure 11:
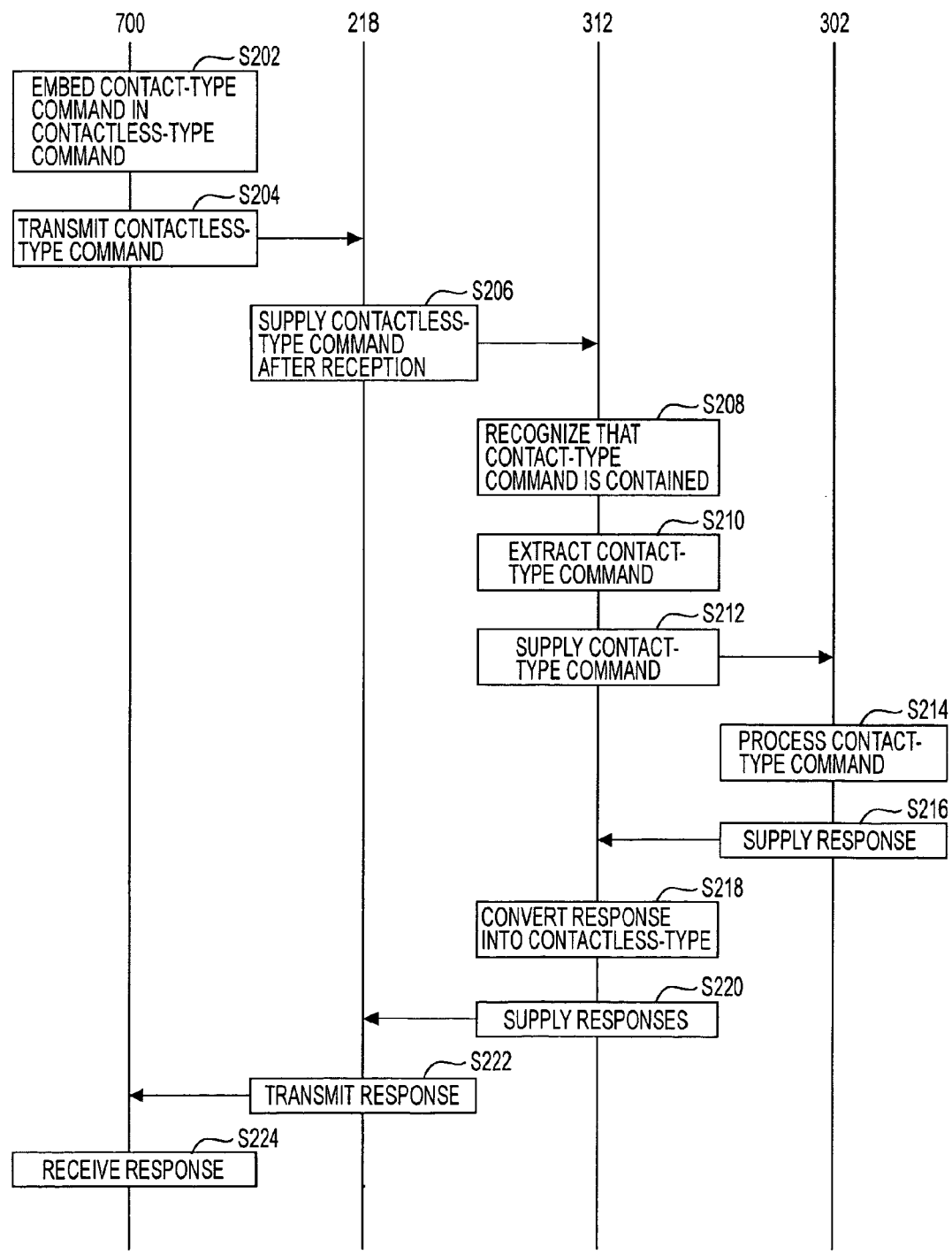
FIG. 11 is a timing diagram illustrating a message process flow performed between the external apparatus and the IC chip in accordance with the embodiment of the present invention.

The communication process flow of the virtual contact-type command message communicated between the contact-type external apparatus 500 and the IC chip 110 has been discussed. A communication process flow of a virtual contactless-type command message communicated between the contactless-type external apparatus 700 and the IC chip 110 is described below with reference to FIG. 11.

In step S202, the contactless-type external apparatus 700 embeds a contact-type command message into a contactless-type command message (step S202). In other words, a virtual contactless-type command message is generated. In step S204, the virtual contactless-type command message is transmitted to the contactless-type communication unit 218 in the contactless communication. The contactless-type communication unit 218 supplies the received virtual contactless-type command message to the message relay unit 312 (step S206).

The message relay unit 312 recognizes that the contactless-type command message contains the contact-type command message (step S208). The contact-type command message is extracted from the virtual contactless-type command message (step S210), and the extracted contact-type command message is supplied to the contact-type message processor 302 (step S212).

The contact-type message processor 302 understands the acquired contact-type command message, performs a process corresponding to the message (step S214) and supplies a response message indicating the process result to the message relay unit 312 (step S216). Since the destination of the response message acquired from the contact-type message processor 302 is the contactless-type external apparatus 700, the message relay unit 312 changes the response message to the format of the contactless-type response message (step S218) and supplies the resulting response message to the contactless-type communication unit 218 (step S220).

The contactless-type communication unit 218 transmits the response message to the contactless-type external apparatus 700 in the contactless communication (step S222). The contactless-type external apparatus 700 receives the response message (step S224). The process thus ends.

Figure 12:
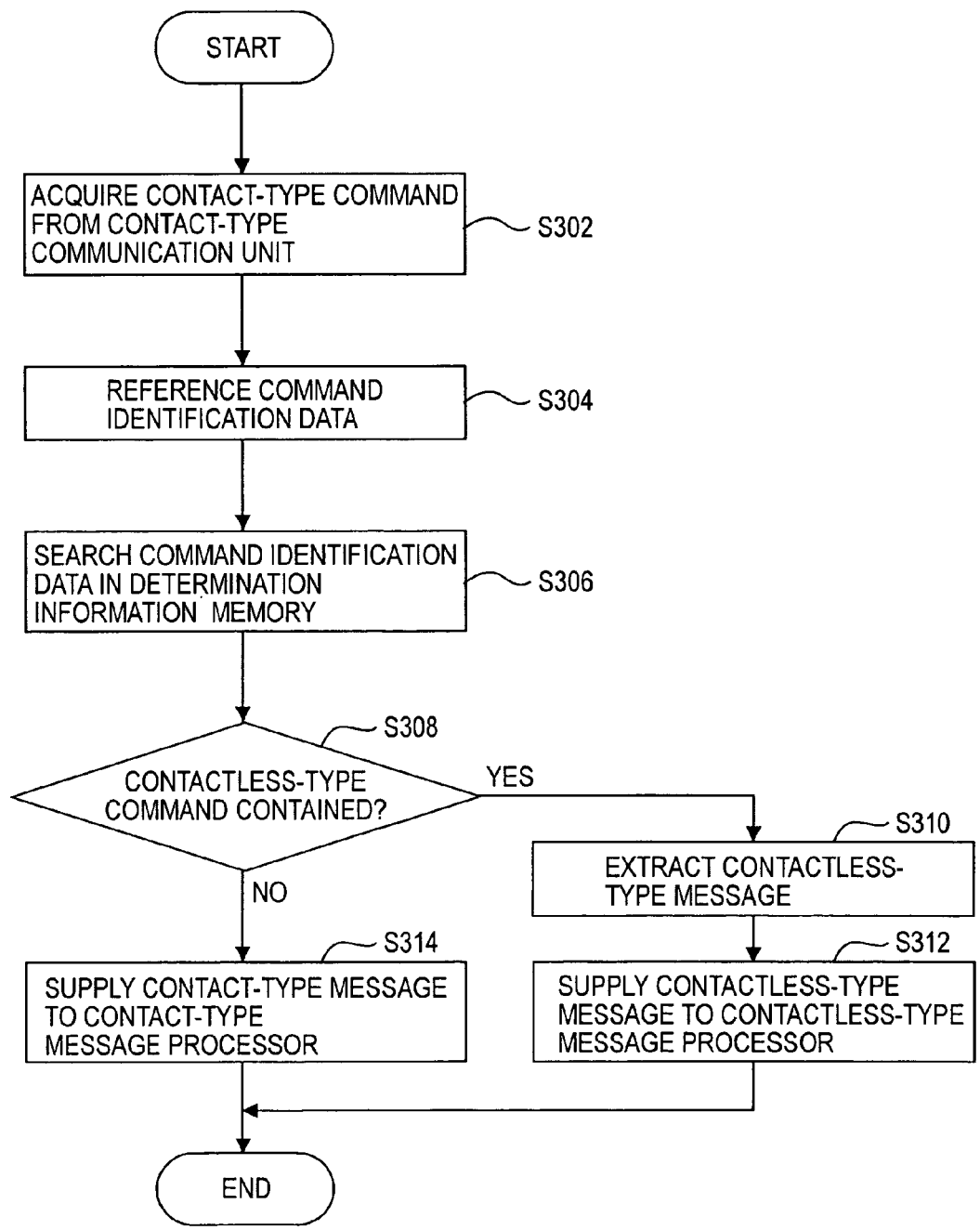
FIG. 12 is a flowchart of a process performed by a message relay unit in accordance with the embodiment of the present invention.

The communication process flow of the virtual contactless-type command message communicated between the contactless-type external apparatus 700 and the IC chip 110 has been discussed. A process flow when the message relay unit 312 receives a contact-type command message from the contact-type communication unit 226 is described below with reference to FIG. 12.

In step S302, the message relay unit 312 receives a contact-type command message from the contact-type communication unit 226. The message determiner 308 of the message relay unit 312 references command identification data present in a predetermined portion of the contact-type command message (more specifically, CLA 602 and INS 604) (step S304) and searches the determination information memory 306 for the corresponding command identification data (step S306).

Based on the command identification data found in the determination information memory 306, the message determiner 308 determines whether the contactless-type command message is contained in the contact-type command message acquired from the contact-type communication unit 226 (step S308). In other words, the message determiner 308 determines whether the contact-type command message is a virtual contact-type command message. If it is determined that the contact-type command message is not a virtual contact-type command message, the message relay unit 312 supplies the contact-type command message to the contact-type message processor 302 (step S314). The process thus ends.

If it is determined that the contact-type command message is a virtual contact-type command message, the message extractor 310 extracts the contactless-type command message contained in the contact-type command message (step S310). The message relay unit 312 supplies the contactless-type command message to the contactless-type message processor 304 (step S312). The process thus ends. If the virtual contact-type command message contains a command to be processed by the contact-type message processor 302, the message relay unit 312 supplies the contact-type command message from which the contactless-type command message has already been extracted to the contact-type message processor 302.

Figure 13:
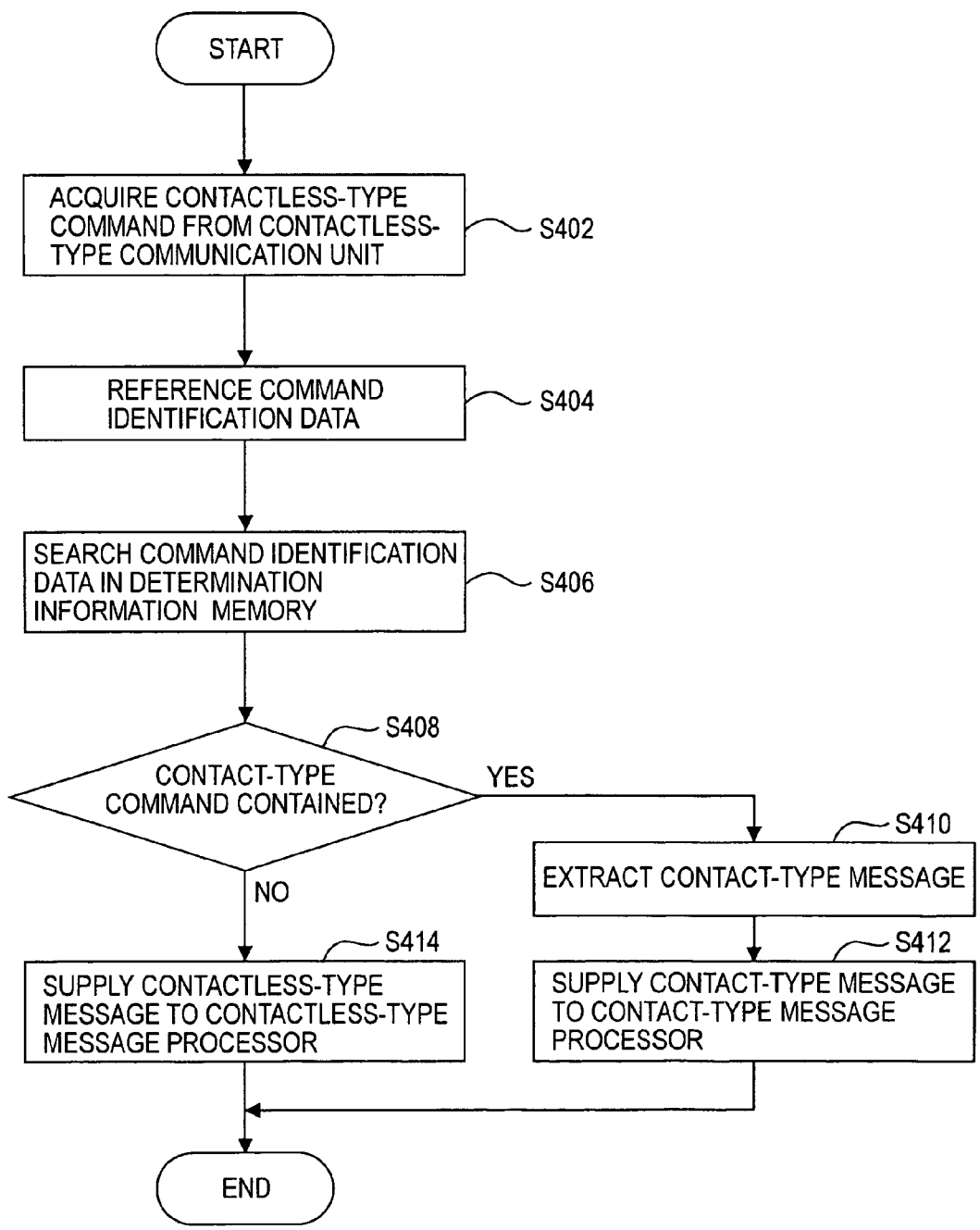
FIG. 13 is a flowchart illustrating a process performed by the message relay unit in accordance with the embodiment of the present invention.

The process of the message relay unit 312 that acquires the contact-type command message from the contact-type communication unit 226 has been discussed. A process of the message relay unit 312 that acquires a contactless-type command message from the contactless-type communication unit 218 is described below with reference to FIG. 13.

In step S402, the message relay unit 312 acquires a contactless-type command message from the contactless-type communication unit 218. The message determiner 308 of the message relay unit 312 references command identification data present in a predetermined portion of the contactless-type command message (i.e., CD 806) (step S404) and searches the determination information memory 306 for the command identification data (step S406).

Based on the command identification data found in the determination information memory 306, the message determiner 308 determines whether a contact-type command message is contained in the contactless-type command message acquired from the contactless-type communication unit 218 (step S408). In other words, the contactless-type command message is a virtual contactless-type command message. If it is determined that the contact-type command message is not a virtual contactless-type command message, the message relay unit 312 supplies the contactless-type command message to the contactless-type message processor 304 (step S414), and the process ends.

If it is determined in step S408 that the contact-type command message is a virtual contactless-type command message, the message extractor 310 extracts the contact-type command message contained in the contactless-type command message (step S410). The message relay unit 312 supplies the contact-type command message to the contact-type message processor 302 (step S412). The process thus ends. If a command to be processed by the contactless-type message processor 304 is contained in the virtual contactless-type command message, the message relay unit 312 supplies the contactless-type command message from which the contact-type command message has been extracted to the contactless-type message processor 304.

The embodiments of the present invention have been discussed with reference to the drawings. The present invention is not limited to the previously described embodiments. It is apparent to those skilled in the art that various changes and modifications are possible in the previously described embodiments without departing from the scope of the present invention. These changes and modifications fall within the scope of the present invention.

In the above discussion, the contact-type message processor and the contactless-type message processor are operating systems. The contact-type message processor and the contactless-type message processor may be application software programs as long as the programs can understand and process messages different in structure.

What is claimed is:

1. A semiconductor integrated circuit communicating messages with an external apparatus in a contact communication and/or a contactless communication, the semiconductor integrated circuit comprising:

a unit for determining whether a contactless-type message to be acquired in the contactless communication from the external apparatus is contained in a contact-type message acquired in the contact communication from the external apparatus and for extracting the contactless-type message from the contact-type message if it is determined that the contactless-type message is contained in the contact-type message; and a unit for determining whether a contact-type message to be acquired in the contact communication from the external apparatus is contained in a contactless-type message acquired in the contactless communication from the external apparatus and for extracting the contact-type message from the contactless-type message if it is determined that the contact-type message is contained in the contactless-type message.

2. A semiconductor integrated circuit communicating messages with an external apparatus in a contact communication and/or a contactless communication, the semiconductor integrated circuit comprising:

a contact-type communication unit for acquiring a contact-type message in the contact communication from the external apparatus;

a contactless-type communication unit for acquiring a contactless-type message in the contactless communication from the external apparatus;

a first message processor for processing the contact-type message;

a second message processor for processing the contactless-type message; and a message relay unit for acquiring the contact-type message from the contact-type communication unit to supply the contact-type message to the first message processor, and for acquiring the contactless-type message from the contactless-type communication unit to supply the contactless-type message to the second message processor.

3. The semiconductor integrated circuit according to claim 2, wherein the message relay unit comprises a message determiner, and wherein the message determiner determines whether the contactless-type message to be supplied to the second message processor is contained in the contact-type message acquired from the contact-type communication unit.

4. The semiconductor integrated circuit according to claim 3, wherein the message determiner determines, based on data of a predetermined portion of the contact-type message acquired from the contact-type communication unit, whether the contactless-type message is contained in the contact-type message.

5. The semiconductor integrated circuit according to claim 3, wherein the message relay unit further comprises a message extractor, and wherein the message extractor extracts the contactless-type message contained in the contact-type message acquired from the contact-type communication unit.

6. The semiconductor integrated circuit according to claim 2, wherein the message relay unit comprises a message determiner, and wherein the message determiner determines whether the contact-type message to be supplied to the first message processor is contained in the contactless-type message acquired from the contactless-type communication unit.

7. The semiconductor integrated circuit according to claim 6, wherein the message determiner determines, based on data of a predetermined portion of the contactless-type message acquired from the contactless-type communication unit, whether the contact-type message is contained in the contactless-type message.

8. The semiconductor integrated circuit according to claim 6, wherein the message relay unit further comprises a message extractor, and wherein the message extractor extracts the contact-type message contained in the contactless-type message acquired from the contactless-type communication unit.

9. The semiconductor integrated circuit according to claim 2, wherein the message relay unit comprises a message determiner, and wherein the message determiner determines whether the contactless-type message to be supplied to the second message processor is contained in the contact-type message acquired from the contact-type communication unit and whether the contact-type message to be supplied to the first message processor is contained in the contactless-type message acquired from the contactless-type communication unit.

10. The semiconductor integrated circuit according to claim 9, wherein the message relay unit further comprises a message extractor, and wherein the message extractor extracts the contactless-type message contained in the contact-type message acquired from the contact-type communication unit, while extracting the contact-type message contained in the contactless-type message acquired from the contactless-type communication unit.

11. A mobile module comprising a semiconductor integrated circuit communicating messages with an external apparatus in a contact communication and/or a contactless communication, the semiconductor integrated circuit comprising:

a unit for determining whether a contactless-type message to be acquired in the contactless communication from the external apparatus is contained in a contact-type message acquired in the contact communication from the external apparatus and for extracting the contactless-type message from the contact-type message if it is determined that the contactless-type message is contained in the contact-type message; and a unit for determining whether a contact-type message to be acquired in the contact communication from the external apparatus is contained in a contactless-type message acquired in the contactless communication from the external apparatus and for extracting the contact-type message from the contactless-type message if it is determined that the contact-type message is contained in the contactless-type message.

12. A mobile module comprising a semiconductor integrated circuit communicating messages with an external apparatus in a contact communication and/or a contactless communication, the semiconductor integrated circuit comprising:

a contact-type communication unit for acquiring a contact-type message in the contact communication from the external apparatus;

a contactless-type communication unit for acquiring a contactless-type message in the contactless communication from the external apparatus;

a first message processor for processing the contact-type message;

a second message processor for processing the contactless-type message; and a message relay unit for acquiring the contact-type message from the contact-type communication unit to supply the contact-type message to the first message processor, and for acquiring the contactless-type message from the contactless-type communication unit to supply the contactless-type message to the second message processor.

13. A message communication method performed between a mobile module communicating messages with an external apparatus in a contact communication and/or a contactless communication, and an external contact-type apparatus communicating messages with the mobile module in a contact communication, the message communication method comprising steps of:

embedding a contactless-type message, to be transmitted to the mobile module in the contactless communication, in a contact-type message to be transmitted to the mobile module in the contact communication;

transmitting the contact-type message containing the contactless-type message to the mobile module;
receiving the contact-type message containing the contactless-type message;
determining whether the contactless-type message is contained in the received contact-type message; and
extracting the contactless-type message contained in the received contact-type message.

14. A message communication method performed between a mobile module communicating messages with an external apparatus in a contact communication and/or a contactless communication, and an external contactless-type apparatus for communicating messages with the mobile module in a contactless communication, the message communication method comprising steps of:
embedding a contact-type message, to be transmitted to the mobile module in the contact communication, in a contactless-type message to be transmitted to the mobile module in the contactless communication;
transmitting the contactless-type message containing the contact-type message to the mobile module;
receiving the contactless-type message containing the contact-type message;
determining whether the contact-type message is contained in the received contactless-type message; and
extracting the contact-type message contained in the received contactless-type message.

15. The semiconductor integrated circuit according to claim 1, wherein the contactless-type messages and the contact-type messages conform to respectively different transmission protocols.

16. The semiconductor integrated circuit according to claim 2, wherein the contactless-type messages and the contact-type messages conform to respectively different transmission protocols.

17. The semiconductor integrated circuit according to claim 3, wherein the contactless-type messages and the contact-type messages conform to respectively different transmission protocols.

18. The semiconductor integrated circuit according to claim 4, wherein the contactless-type messages and the contact-type messages conform to respectively different transmission protocols.

19. The semiconductor integrated circuit according to claim 5, wherein the contactless-type messages and the contact-type messages conform to respectively different transmission protocols.

20. The semiconductor integrated circuit according to claim 6, wherein the contactless-type messages and the contact-type messages conform to respectively different transmission protocols.

21. The semiconductor integrated circuit according to claim 7, wherein the contactless-type messages and the contact-type messages conform to respectively different transmission protocols.

22. The semiconductor integrated circuit according to claim 8, wherein the contactless-type messages and the contact-type messages conform to respectively different transmission protocols.

23. The semiconductor integrated circuit according to claim 9, wherein the contactless-type messages and the contact-type messages conform to respectively different transmission protocols.

24. The semiconductor integrated circuit according to claim 10, wherein the contactless-type messages and the contact-type messages conform to respectively different transmission protocols.

25. The semiconductor integrated circuit according to claim 11, wherein the contactless-type messages and the contact-type messages conform to respectively different transmission protocols.

26. The semiconductor integrated circuit according to claim 12, wherein the contactless-type messages and the contact-type messages conform to respectively different transmission protocols.

27. The semiconductor integrated circuit according to claim 13, wherein the contactless-type messages and the contact-type messages conform to respectively different transmission protocols.

28. The semiconductor integrated circuit according to claim 14, wherein the contactless-type messages and the contact-type messages conform to respectively different transmission protocols.

* * * * *